US010097269B2

(12) United States Patent
Mahloo et al.

(10) Patent No.: US 10,097,269 B2
(45) Date of Patent: Oct. 9, 2018

(54) PASSIVE OPTICAL NETWORKS STRUCTURE AND A REMOTE NODE IN A BACKHAUL COMMUNICATION NETWORK

(71) Applicant: TELEFONAKTIEBOLAGET LM ERICSSON (PUBL), Stockholm (SE)

(72) Inventors: Mozhgan Mahloo, Solna (SE); Jiajia Chen, Kista (SE); Lena Wosinska, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/509,553

(22) PCT Filed: Sep. 8, 2014

(86) PCT No.: PCT/SE2014/051029
§ 371 (c)(1),
(2) Date: Mar. 8, 2017

(87) PCT Pub. No.: WO2016/039670
PCT Pub. Date: Mar. 17, 2016

(65) Prior Publication Data
US 2017/0288777 A1 Oct. 5, 2017

(51) Int. Cl.
*H04B 10/2575* (2013.01)
*H04B 10/27* (2013.01)
(Continued)

(52) U.S. Cl.
CPC ..... *H04B 10/25753* (2013.01); *H04B 10/271* (2013.01); *H04B 10/00* (2013.01);
(Continued)

(58) Field of Classification Search
None
See application file for complete search history.

(56) References Cited

U.S. PATENT DOCUMENTS

2006/0239683 A1* 10/2006 Park ................... H04J 14/0226
398/71
2010/0290782 A1* 11/2010 Lee ..................... H04B 10/272
398/58

FOREIGN PATENT DOCUMENTS

EP 2475121 A1 7/2012
EP 2510707 A1 10/2012
EP 2573967 A1 3/2013

OTHER PUBLICATIONS

Hogan, Mobile Backhaul and Synchronization for Heterogeneous Networks, ITSF 2012: Time & Sync in Telecoms, Nice, France, Nov. 6-8, 2012.
(Continued)

*Primary Examiner* — Darren E Wolf
(74) *Attorney, Agent, or Firm* — NDWE LLP

(57) ABSTRACT

A Passive Optical Networks (PONs) structure and a remote node in such a structure constituting at least a part of a backhaul network for supporting a Radio Access Network, in which a number of radio base stations are connected to optical networks units (ONUs) of said PONs structure. The ONUs of said PONs structure are grouped between separate PONs of said PONs structure. The ONUs of a separate PON are interconnected passively through a remote node of the PON in order to separate inter base station traffic of X2 interfaces from uplink and downlink data traffic of S1 interface heading from/to a core network via an optical line terminal (OLT). The remote node comprises of power splitter for enabling interconnection between ONUs of different PONs of said PONs structure.

8 Claims, 10 Drawing Sheets

(51) Int. Cl.
*H04W 92/20* (2009.01)
*H04B 10/00* (2013.01)
*H04B 10/25* (2013.01)
*H04B 10/272* (2013.01)

(52) U.S. Cl.
CPC .......... *H04B 10/25* (2013.01); *H04B 10/2575* (2013.01); *H04B 10/272* (2013.01); *H04W 92/20* (2013.01)

(56) References Cited

OTHER PUBLICATIONS

Pfeiffer, Converged Heterogeneous Optical Metro-Access Networks, ECOC 2010, Torino, Italy, Sep. 19-23, 2010.
FP7 EU project Discus, D4.3, Integrated architectures for LR-PON supporting wireless and wireline services, 2013.
Choi, et al., Mobile WDM Backhaul Access Networks with Physical Inter-Base-Station Links for Coordinated Multipoint Transmission/Reception Systems, IEEE Globecom 2011 Proceedings, 2011.
Yang, et al., How Do We Design CoMP to Achieve its Promised Potential?, IEEE Wireless Communications, vol. 20, Issue 1, pp. 67-74, Feb. 2013.
Aurzada, et al., Delay analysis of Ethernet passive optical networks with gated service, Journal of Optical Networking, vol. 7, Issue 1, 2008.
Liem, P2P Locality Awareness Architecture in Ethernet Passive Optical Networks, IEEE Quality in Research Conference 2013, pp. 111-115, 2013.
International Preliminary Report on Patentability for Application No. PCT/SE2014/051029, dated Mar. 23, 2017, 7 pages.
International Search Report and Written Opinion for Application No. PCT/SE2014/051029, dated Mar. 10, 2016, 10 pages.

* cited by examiner

PASSIVE OPTICAL NETWORKS STRUCTURE AND A REMOTE NODE IN A BACKHAUL COMMUNICATION NETWORK

This application is a 371 of International Application No. PCT/SE2014/051029, filed Sep. 8, 2014, the disclosure of which is fully incorporated herein by reference.

TECHNICAL FIELD

The present technology relates to a passive optical networks structure and a remote node in a backhaul communication network.

BACKGROUND

In the recent years the exponential growth of number of mobile devices and mobile traffic, mainly driven by an increase in the demand for video services, brings new challenges for mobile network operators in terms of providing high capacity solutions with a good quality of service.

FIG. 1 is a block diagram illustrating one example of a backhaul optical network topology according to prior art.

The illustrated backhaul network PA10 comprises one optical line terminal, OLT, 10 which routes data traffic from one optical network unit, ONU, 50 to another ONU 50. The OLT is further handling the data traffic between a core network on the uplink side of the OLT and the downlink residing ONUs. Each ONU is electrically connected to a base station 80, e.g. an eNB, for serving radio telecommunication traffic to and from user equipments residing in a radio coverage area 90, i.e. cell, of the base station. The ONUs 50 are physically connected to OLT 10 via optical fibres 20, which is the transport media for the optical channels, $\lambda$ and maybe a remote node. The optical channels are either directed upstream $\lambda u$, from the ONUs towards the OLT, or downstream, $\lambda d$.

In the 3GPP standards two interfaces are defined for eNB. One of them, which is called S1 interface, is defined for the communication between eNB and the central aggregation switch in the mobile core network, while the other one referred to as X2, is a logical interface for the direct exchange of information between base stations. In a LTE backhaul network, S1 and X2 interfaces of a LTE base station are connected to the ONU. Two ONUs may be directly connected point to point via an fiber 22 for transmitting data related to LTE X2 interfaces between two base stations 80.

An ONU is a device that transforms incoming optical signals into electronics at a customer's premises in order to provide telecommunications services over an optical fibre network. An ONU is a generic term denoting a device that terminates any one of the endpoints of a fibre to the premises network at the user side, implements a passive optical network (PON) protocol, and adapts PON Patent Data Units to subscriber service interfaces. In some contexts, an ONU implies a multiple subscriber device.

An optical line termination, also called an optical line terminal, is a device which serves as the service or network provider endpoint of an optical access network. It provides two main functions:
1. to perform conversion between the electrical signals used by the service providers equipment and the fibre optic signals used by the passive optical; network;
2. to coordinate the multiplexing between the conversion devices on the other end of that network, called either optical network terminals or optical network units.

Coordinated multipoint, CoMP, transmission and reception is introduced in the long term evolution (LTE)-Advanced framework due to its potential for improving the network throughput and spectral efficiency especially in the cell edges. In case of CoMP, the LTE evolved nodes B, eNBs, exchange the cell information and/or user data among a cluster of adjacent nodes through mobile backhaul networks. Therefore the quality of the user signal, especially in the cell edges, is highly dependent on the CoMP backhauling solutions.

The most important barrier for the large scale implementation of CoMP is the strict latency constraint and high capacity requirements in the link between the X2 interfaces. Depending on the type of transmission techniques used for CoMP the delay requirement is ranged from less than 0.5 msec (using Common Public Radio Interface, CPRI) till 10 msec (for moderate to tight coordination). This requirement may not be easily fulfilled with the current generation of backhaul networks when considering processing delay in optical line terminal, OLT, routers and switches as well as long fibre path. The limited capacity and latency issue of the available backhaul networks might act as the bottleneck for the CoMP implementations.

Thus, when interconnecting the base station nodes, eNBs, backhauled via two or more different PONs, said interconnection has to be via either the OLT from one PON to the OLT of another PON, or from ONU to ONU directly in the different PONs. Interconnection between the OLT:s has the drawback that the strict latency constraint for the X2 interface is likely to be exceeded. For interconnection of eNB nodes belonging to different PONs, the end-to-end delay is also dependent on the distance between two OLTs, the propagation delay in the uplink direction towards aggregation network, and two times of the processing delay at the OLTs. The ONU to ONU direct interconnection between ONUs of the different PONs has the drawback that is very inflexible and expensive, especially at network involving a large number of eNBs.

Considering the long reach PON, i.e., with a reach larger than 60 km, the round trip time for the data sent from one ONU to the other ONU in the same PON, excluding the processing time is around 0.6 ms, which is already higher than delay requirements of CoMP with tight coordination. Most of the available research considered a direct point to point, PtP, fibre link between eNBs and focused on the wireless transmission issues only. However, the PtP links might not be feasible due to the high cost of fibre deployments.

Therefore, it was proposed to use a splitter box containing several splitters and Wavelength Division Multiplexing, WDM, diplexers in order to interconnect base stations directly.

FIG. 2 is a block diagram illustrating a backhaul topology according to the prior art described above.

The prior art backhaul network PA20 illustrated in FIG. 2 differs from the prior art backhaul network PA10 in FIG. 1 in that a remote node with special splitter arrangement is introduced between the ONUs 50 and the OLT 10. The remote node comprises a splitter arrangement 30 comprising several splitters. Different eNBs and their corresponding ONU:s of the same PON are interconnected in a logical point to point manner via the remote node and its splitter arrangement 30, as illustrated by the dashed-dotted lines X2:12, X2:13 and X2:23. The dashed-dotted lines illustrate the logical links between two ONUs. Thus, X2:12 illustrates the logical link between ONU:1 and ONU:2, X2:23 illustrates the logical link between ONU:2 and ONU:3, and X2:13 illustrates the logical link between ONU:1 and ONU:3. The known technique is based on the passive optical network, PON, technology and needs N+1 wavelength channels to connect N neighbours per node. Interconnection of two ONU:s belonging to different PON:s is performed via the OLT to OLT connection.

Sending back the traffic in the remote node (which is located in a distance from cells lower than 1 km in dense areas, and up to 5 km in rural areas) as well as removing any intermediate electronic processing (e.g., in the OLT, switches and routers) between X2 interfaces, will lead to a much faster virtual link than in the topology of FIG. 1 when no PtP fibre is available.

The solutions proposed in FIGS. 1 and 2 are neither scalable nor flexible. They are also technology dependent. Dynamic clustering of eNBs, typically outperforms static clustering in terms of flexibility and performance. However, the proposed networks in FIGS. 1 and 2 do not support dynamic clustering. Besides, the required splitter box in FIG. 2 may also become very complicated.

SUMMARY

In the following disclosure, it is provided Passive Optical Network, PON, structure and a remote node that addresses a number of drawbacks with known solutions. One object is to propose a PON structure and a remote node that provides more flexibility regarding scalability and cell clustering with minimizing the latency and cost.

In accordance with one aspect of the following disclosure, a passive optical network structure and embodiments thereof are presented. The Passive Optical Networks, PONs, structure constitutes at least a part of a backhaul network for supporting a Radio Access Network, in which a number of radio base stations are connected to optical networks units, ONUs, of said PONs structure. The ONUs of said PONs structure are grouped between separate PONs of said PONs structure. The ONUs of a separate PON are interconnected passively through a remote node of the PON in order to separate inter base station traffic of X2 interfaces from uplink and downlink data traffic of S1 interface heading from/to a core network via an optical line terminal. The remote node comprises of power splitter for enabling interconnection between ONUs of different PONs of said PONs structure.

In accordance with one aspect of the following disclosure, a remote node and embodiments thereof are presented. A Passive Optical Networks, PONs, structure constitutes at least a part of a backhaul network for supporting a Radio Access Network, in which a number of radio base stations are connected to optical networks units, ONUs, of said PONs structure. The ONUs of said PONs structure are grouped between separate PONs of said PONS structure, wherein ONUs of a separate PON are interconnected passively through the remote node of the PON in order to separate inter base station traffic of X2 interfaces from uplink and downlink data traffic of S1 interface heading from/to a core network via an optical line terminal. The remote node comprises a power splitter for enabling connection of the remote node to ONUs of at least one other PON of said PONs structure.

One advantage of the proposed technique is that it is highly flexible and can support any cluster size and covering areas with various cell densities. It is possible to provide partial or full protection if needed without any significant extra investment. Proposed structure helps to increase the data throughput and quality of signal in the cell edges. It allows having a high capacity and low latency interconnection between the X2 interfaces of eNBs with minimum investment on the fibre infrastructure.

BRIEF DESCRIPTION OF THE DRAWINGS

The foregoing, and other, objects, features and advantages of the present technique will be more readily understood upon reading the following detailed description in conjunction with the drawings in which.

DETAILED DESCRIPTION

In the following description, for purposes of explanation and not limitation, specific details are set forth, such as particular circuits, circuit components, techniques, etc. in order to provide a thorough understanding of the present technique. However, it will be apparent to one skilled in the art that the present technique may be practiced in other embodiments that depart from these specific details. In other instances, detailed descriptions of well-known methods, devices, and circuits are omitted so as not to obscure the description of the present technique with unnecessary detail.

In the description and claims of this disclosure, downstream or downlink direction in a Passive Optical Network, PON, comprising an Optical Line Terminal, OLT, in one end of the PON and one or more Optical Network Units, ONUs, in the other end of the PON is defined as data traffic sent towards the end or ends of the ONUs. Upstream or uplink direction is defined as the opposite direction to downstream or downlink direction. Thus, upstream or uplink direction is defined as data traffic sent towards the end of the OLT.

One object of the following disclosure is to present a Passive Optical Networks, PONs, structure compliant overlay architecture for direct connectivity between neighbouring cells by removing intermediate electronic processing.

The idea is to use a modified splitter, i.e. a power splitter, in a remote node. Specially designed ONUs are also provided in this disclosure. The proposed technique can provide full mesh connectivity among ONUs supporting various degree of required connectivity between radio base stations, e.g. eNBs, which are evolved NodeBs defined in LTE standards.

The technique is based on broadcasting upstream data from each cell, to all the adjacent eNBs by sending back traffic in the remote node using Time Division Multiple Access, TDMA, or Wavelength Division Multiple Access, WDMA in case of CPRI. The ONUs and the OLTs are communicating via point to multipoint PON architectures, such as WDM-PON, TDM-PON or TWDM-PON.

Figure 1:
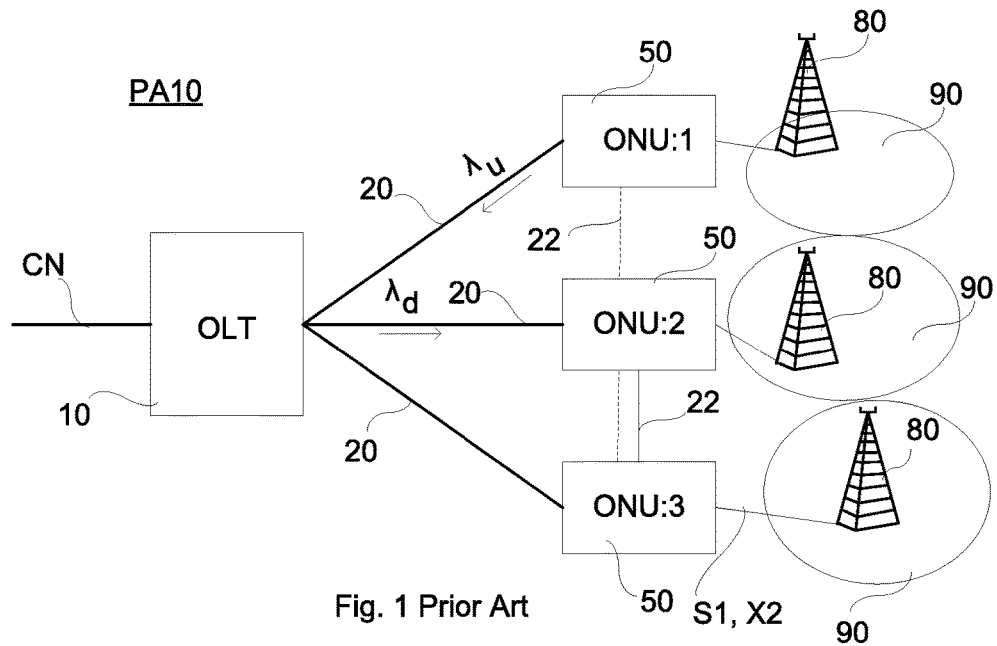
FIG. 1 is a block diagram illustrating one example of a backhaul network topology according to prior art.
Figure 2:
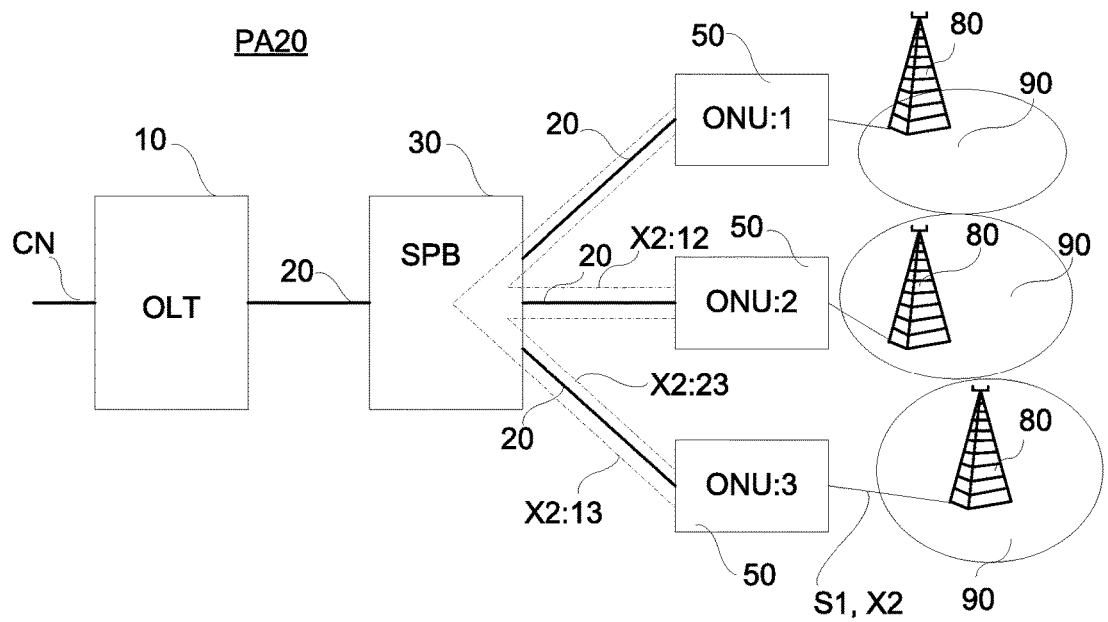
FIG. 2 is a block diagram illustrating further one example of a backhaul topology according to prior art.
Figure 3:
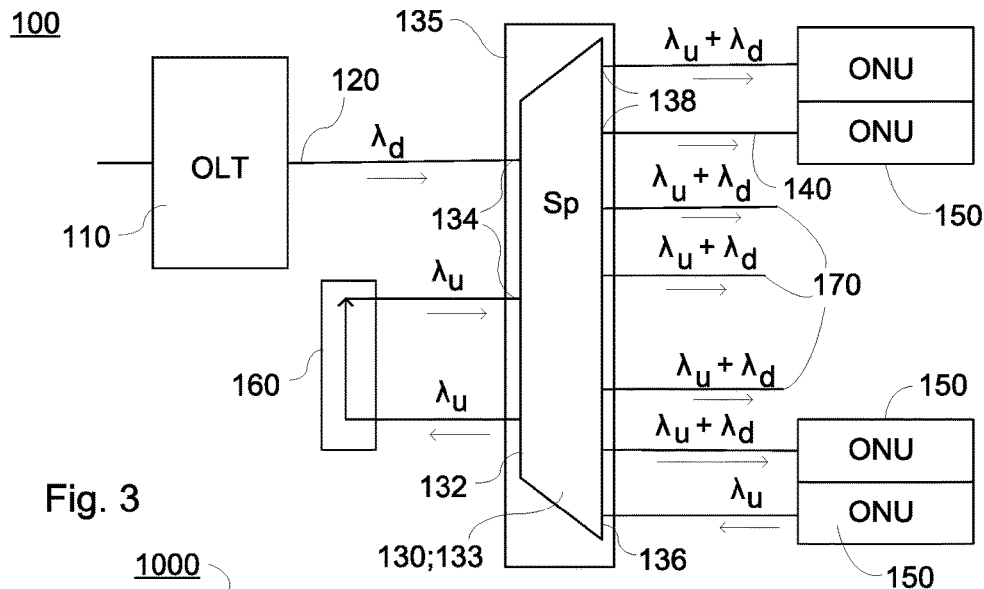
FIG. 3 is a block diagram illustrating one example of a PON according to one proposed solution herein.

FIG. 3 is a block diagram illustrating one example of a PON to be used in a PONs structure of a backhaul network topology according to one proposed solution herein.

The illustrated PON 100 comprises one optical line terminal, OLT, 110 which routes data traffic to optical network units, ONU, 150. The OLT is further handling the data traffic between a core network on the uplink side of the OLT and the downlink side residing ONUs.

Each ONU is electrically connected to a base station (not shown), e.g. an eNB, for serving radio telecommunication traffic to and from user equipments residing in a radio coverage area, i.e. cell, of the base station. The ONUs 150 are physically connected to OLT 110 via optical fibres 120, 140 that are the transport media for the optical channels, λ. The optical channels are either directed uplinks λu, from the ONUs towards the OLT, or downlinks, λd.

A remote node 135 is located between the ONUs 150 and the OLT 10. The remote node comprises a power splitter 130 or a splitter arrangement 133 comprising several power splitters. Different ONU:s 150 are logically interconnected via the remote node 135 and its splitter arrangement 133. The power splitter 130 has an upstream side 132 and a downstream side 136.

FIG. 3 shows the structure of a 3×N splitter located in the remote node 135. The 3×N means that the splitter has 3 input/output ports 134 on the upstream side 132, and N input/output ports 138 on the downstream side 136. On the upstream side, the OLT 110 is connected to one of the input/output ports 134 via an optical fibre 120 and two other input/output ports 134 of the splitter are bypassed via an isolator 160. On the downstream side 136, the ports 138 are either connected via optical connections 140 to ONUs 150 within the PON 100 or to ONUs in one or more external PONs via optical connections 170.

As illustrated, the OLT routes or sends data traffic addressed to a user served by a special ONU 150. An optical channel λd is broadcasted from the OLT 110 to the ONUs 150 via the fibre links 120, 140 and the power splitter 130.

By connecting two input ports 134 of the power splitter 130 via the isolator 160, the upstream traffic from one ONU is redirected to all connected ONUs through the power splitter 130. Therefore, the local traffic does not need to travel all the way up to the OLT. This will also alleviate the amount of traffic passing the OLT and fibre (feeder fibre) between OLT and power splitter 130. So the local traffic will stay close to the cells and the load of higher aggregation levels of the access network is reduced.

In FIG. 3, one ONU 150 is transmitting data packet traffic upstream via the optical channel λu. The power splitter 130 receives the data traffic, the isolator 160 redirects the traffic on channel λu to all connected ONUs through the power splitter 130.

This technique to redirect data traffic is herein proposed to redirect data traffic both to ONUs within the PON, and to ONUs of neighbouring PONs. Thus, the fibre links 140 may be connected to ONUs (not shown) within the PON, and some of the fibre links to ONUs of neighbouring PONs constituting splitter to ONU connections 170. Such a solution is exemplified in FIG. 4.

The above described PON and PONs structure offers a number of advantages, e.g. compliancy with all splitter based PON technologies e.g., TDM, WDM and TWDM PON, etc, low latency X2 backhauling, i.e. compatible with latency constraint of CoMP transmission, low cost, fixed and mobile backhaul coexistence, and capacity saving in feeder fibres, OLT and aggregation networks.

Figure 4:
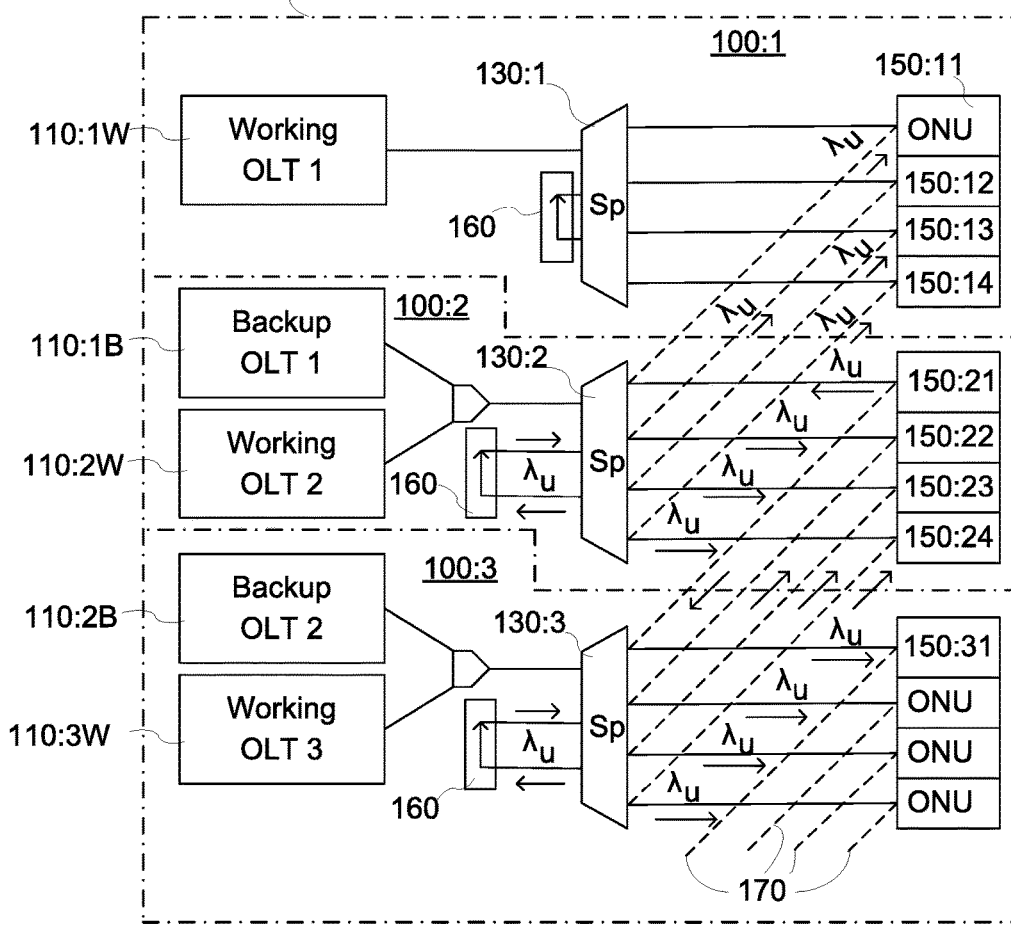
FIG. 4 is a block diagram illustrating another example of a PONs structure according to further one proposed solution herein.

FIG. 4 is a block diagram illustrating one example of a PONs structure for a backhaul network topology according to the proposed technology.

The PONs structure according to the example comprises three PONs 100:1, 100:2 and 100:3. The three PONs may also be a part of a larger backhaul network comprising several PONs.

Two of the PONs 100:2 and 100:3 have the same structure as the PON 100 describe above with reference to FIG. 3. The power splitter 130:2 of PON 100:2 is connected to ONUs 150 of PON 100:1 and PON 100:2 via splitter to ONU connections 170. The power splitter 130:3 of PON 100:3 is connected to ONUs 150 of PON 100:2 and PON 100:3 via splitter to ONU connections 170. The splitter to ONU connections 170 between power splitter of one PON and ONUs of neighbouring PONs are indicated with dashed lines.

In one of the PONs, PON 100:1, the power splitter 130:1 is not connected to ONUs of another PON. However, the ONUs 150:11, 150:12, 150:13 and 150:14 are connected to the power splitter 130:2 of PON 100:2.

Further, all power splitters 130:1, 130:2 and 130:3 are provided with an isolator 160 for redirecting the traffic on channel λu to all connected ONUs through the power splitter 130.

As an example, the ONU 150:21 of PON 100:2 sends data packet traffic upstream via λu towards power splitter 130:2 and power splitter 130:3 having two input ports 134 of the power splitter connected via an isolator 160. An isolator connection results in redirection of the traffic on channel λu to all connected ONUs through the power splitter 130:2 and power splitter 130:3, both within the PON 100:2 and to the ONUs of the neighbouring PONs 100:1 and 100:3.

Thus, the isolator 160 secures that the traffic on channel λu is redirected to all connected ONUs.

The PONs are further provided with one working OLT 110:W and a backup OLT 110:B. Thus, one of the OLTs is operating and working in the PON it is situated, and the other OLT 110:B is meant to operate as a backup OLT for a neighbouring PON in case of a failure of the ordinary OLT 110:W of said neighbouring PON or failure in other parts of the connection.

As an example, backup OLT 2 110:2B is situated in PON 100:3 which is a neighbouring PON to PON 100:2 wherein the operating OLT is working OLT 2 110:2W. The power splitter 130:3 of PON 100:3 connects backup OLT 2 110:2B with the ONUs 150:21,150:22, 150:23, 150:24 via splitter to ONU connections 170 (indicated with dashed lines). If the working OLT 2 goes down due to failure, a backup system will start up the backup OLT 2 110:2B which replaces the former working OLT 2 110:2W.

Further, PON 1 has a backup OLT 1 110:1B that is situated in PON 100:2 which is a neighbouring PON to PON 100:1. The operating OLT PON:1 is working OLT 1 110:1W. The power splitter 130:2 of PON 100:2 connects backup OLT 1 110:1B with the ONUs 150:11,150:12, 150:13, 150:14 via splitter to ONU connections 170 (indicated with dashed lines). If the working OLT 1 goes down due to failure, a backup system will start up the backup OLT 1 110:1B which replaces the former working OLT 1 110:1W.

PON 100:3 has a working OLT 3 110:3W and said PON may have a backup OLT (not shown) as the ONUs 150:31, . . . , have splitter to ONU connections 170 (indicated with dashed lines) to a power splitter of another PON. PON 100:1 does not have a backup OLT for another OLT and corresponding ONUs and there are no splitter to ONU connections 170.

Besides the advantages described in the described PON and PONs structure of FIG. 3, the PON and PONs structure of FIG. 4 offers further advantages, e.g. dynamic clustering of eNBs in LTE advance, and improved user experience, and having same quality of signal all over the area.

Figure 5:
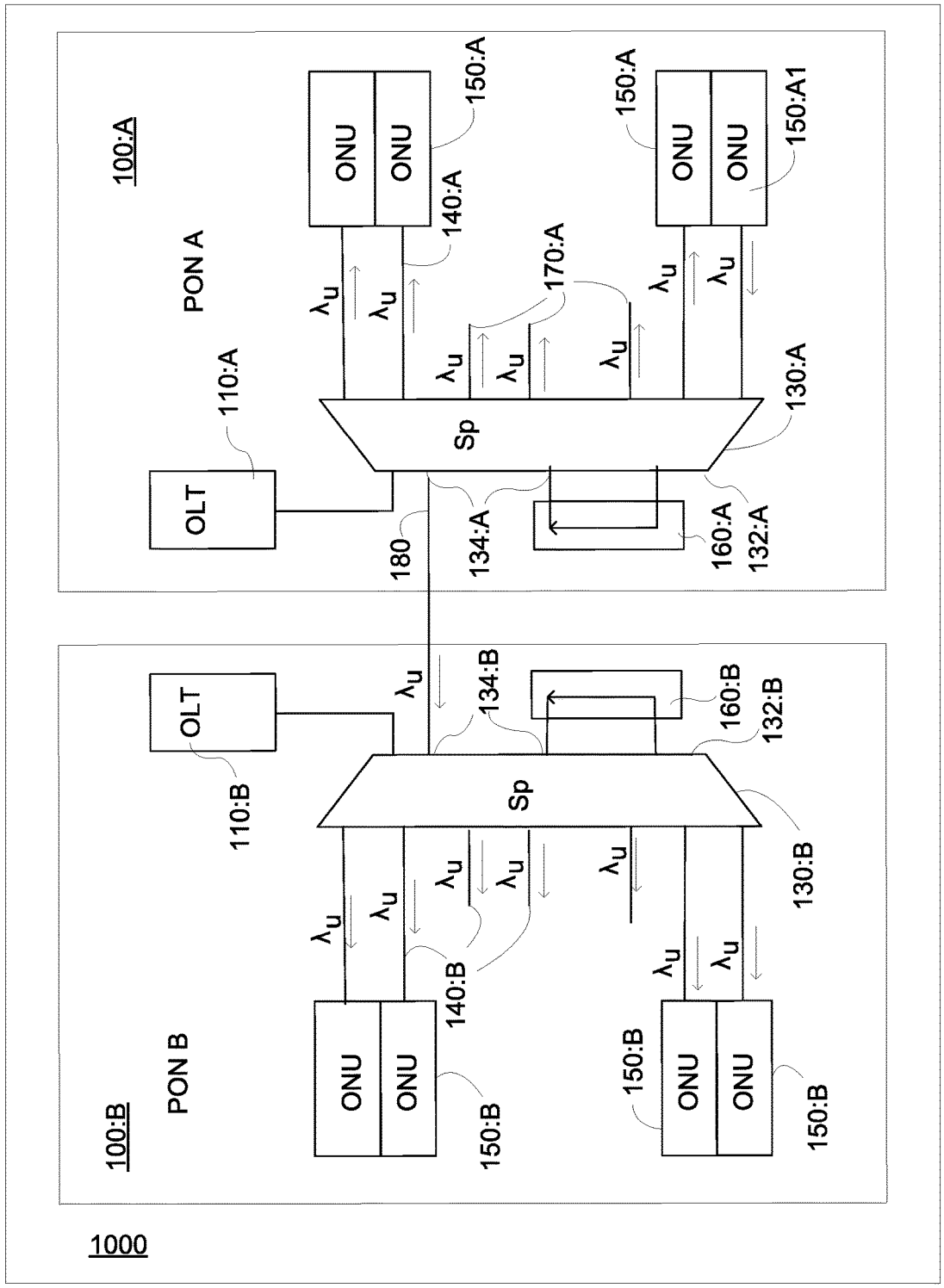
FIG. 5 is a block diagram illustrating an implementation of the PONs structure according to one proposed solution herein.

FIG. 5 is illustrating a splitter to splitter connection of different PONs in a PONs structure 1000.

Two PONs, PON A 100:A and PON B 100:B, are illustrated in FIG. 5.

PON A comprises an Optical Line Termination OLT 110:A, a power splitter Sp 130:A and optical network units, ONUs, 150:A of which one ONU is indicated as 150:A1. The OLT 110:A is physically via optical fibre connected to the power splitter 130:A, which is further connected via fibre links 140:A to ONUs in the same PON as the OLT A and the power splitter 130:A, and, optionally via fibre links of a splitter to UNO connections 170:A to ONUs in other PONs (not shown). On the upstream side 132:A of the power splitter 130:A is some of the ports or interfaces 134:A connected to an isolator 160:A.

A PON B 100:B of the PONs structure 1000 is designed in a similar manner. PON B comprises an Optical Line Termination OLT 110:B, a power splitter Sp 130:B and optical network units, ONUs, 150:B. The OLT 110:B is physically via optical fibre connected to the power splitter 130:B, which is further connected via fibre links 140:B to ONUs in the same PON as the OLT B and the power splitter 130:B. Optionally via fibre links of a splitter to UNO connections to ONUs in other PONs (not shown). On the upstream side 132:B of the power splitter 130:B is some of the ports or interfaces 134:B connected to an isolator 160:B.

According to this implementation, the broadcasting of data traffic between different PONs is achieved by a splitter to splitter connection 180 and an isolator 160:A. Thus, a port or interface 134:A on the upstream side (132:A in FIG. 5) of the power splitter 130:A in PON A 100:A is connected via an optical fibre to a port or interface 134:B on the upstream side 132:B of the power splitter 130:B of PON B, 100:B.

One ONU 150:A1 is transmitting data packet traffic upstream via the optical channel λu. The power splitter 130:A receives the data traffic, the isolator 160:A redirects the traffic on channel λu to all connected ONUs of this PON through the power splitter. By means of the optical connection 180 between two power splitters, the data traffic is forwarded from PON A to PON B and via the power splitter 130:B of PON B to connected ONUs 150:B. There is no processing of the data traffic necessary. The above described PON and PONs structure according to FIG. 5 offers a number of advantages, e.g. compliancy with all splitter based PON technologies e.g., TDM, WDM and TWDM PON, etc, low latency X2 backhauling, i.e. compatible with latency constraint of CoMP transmission, low cost, fixed and mobile backhaul coexistence, and capacity saving in feeder fibres, OLT and aggregation networks.

Figure 6:
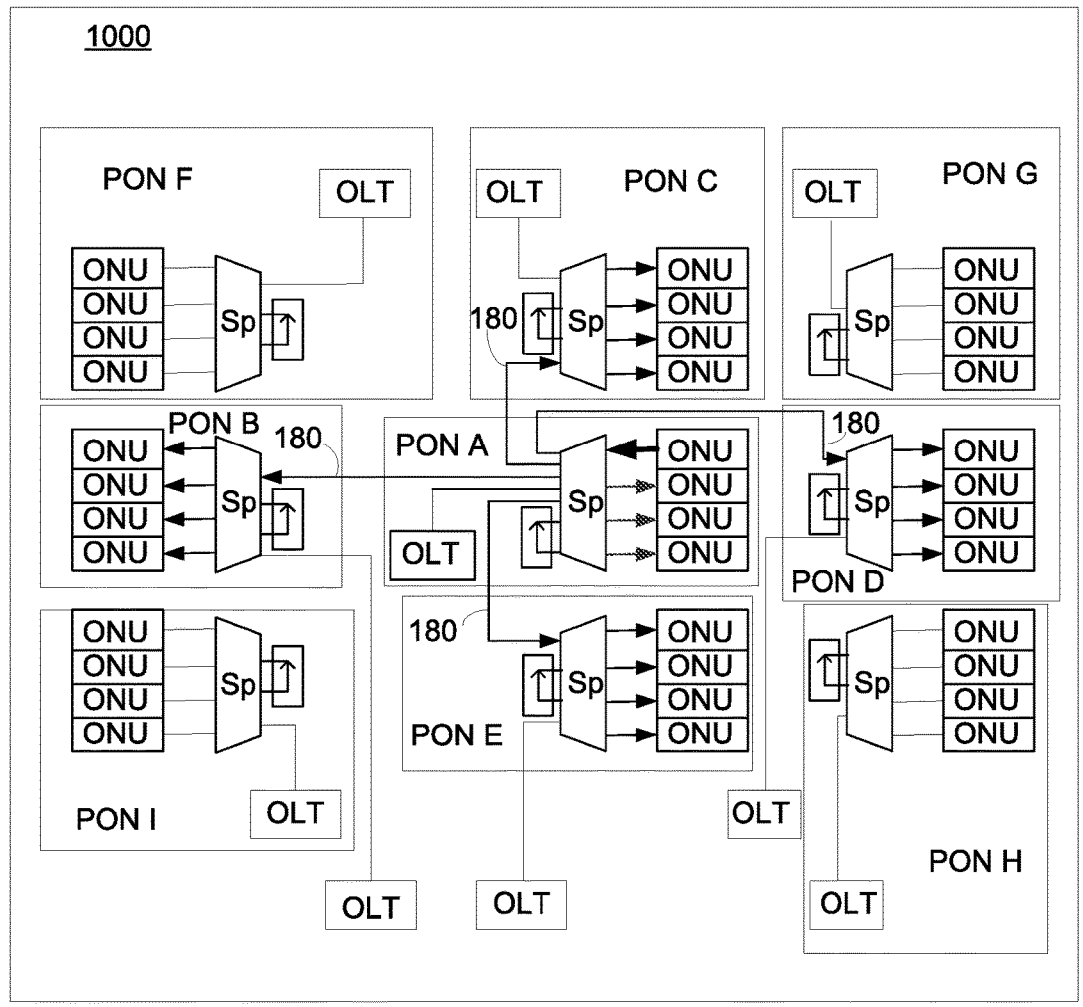
FIG. 6 is a block diagram illustrating further one implementation of the PONs structure according to one proposed solution herein.

FIG. 6 is the block diagram illustrating further one implementation of a PONs structure of a backhaul network topology according to one proposed solution herein.

FIG. 6 illustrates a PONs structure 1000 comprising a number of PONs, each comprising an Optical Line Terminal OLT, a splitter Sp and optical network units ONUs as illustrated e.g. in FIG. 4.

According to this implementation, the broadcasting of data traffic between different PONs are achieved by a splitter to splitter connection. Thus, a port or interface on the upstream side (132 in FIG. 5) of the splitter in one PON is connected to a port or interface on the upstream side of a splitter of another PON via optical fibre.

One ONU 150 in PON A is transmitting data packet traffic related to X2 interfaces, upstream via the optical channel λu. The splitter 130 of PON A receives the data traffic, the isolator 160 redirects the traffic on channel λu to all connected ONUs of the same PON, in this case PON A, through the splitter. By means of the optical connections 180, the data traffic is forwarded from PON A to the other connected PONs and via the splitter of the remote node in each connected PON to connected ONUs. PON A is connected to PON B, PON C, PON D and PON E via said splitter to splitter connection 180. There is no processing of the data traffic necessary.

Besides the advantages described in the described PON and PONs structure of FIG. 5, the PON and PONs structure of FIG. 6 offers further advantages, e.g. high flexibility for backhaul connectivity between cells, fully extendable inter-RBS connectivity, dynamic clustering of eNBs in LTE advance, and improved user experience, and having same quality of signal all over the area.

Figure 7:
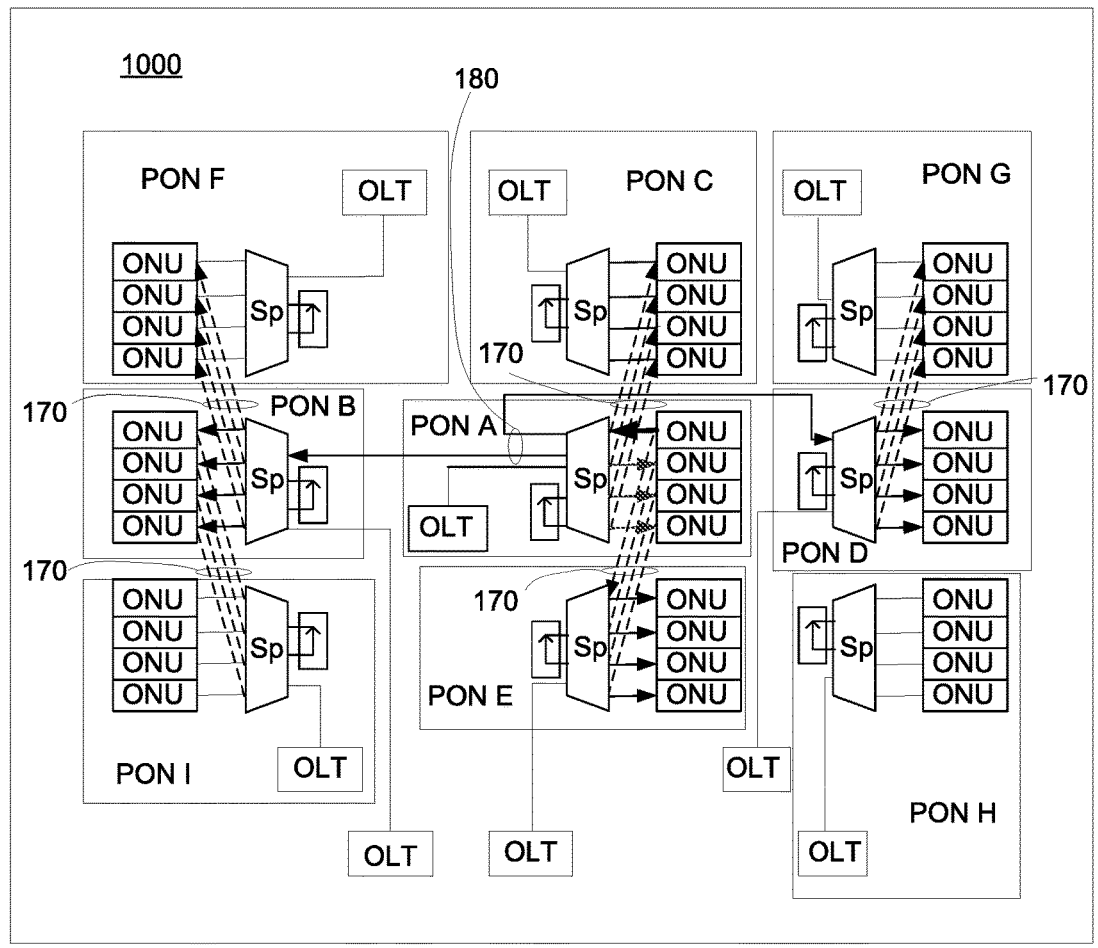
FIG. 7 is a block diagram illustrating yet another implementation of the PONs structure according to one proposed solution herein.

FIG. 7 is a block diagram illustrating yet another implementation of a PONs structure according to one proposed solution herein.

In FIG. 7 is illustrated a combination of splitter to ONU connection as in FIG. 4 and splitter to splitter connection as in FIGS. 5 and 6. FIG. 7 illustrates also the flexibility provided by using different PON connections, splitter to splitter connection 180 or splitter to ONU connection 170.

The PONs structure 1000 comprises the same set of PONs as in FIG. 6. However, some of the splitter to splitter connections 180 have been replaced by splitter to ONU connections 170 in order to add end to end protection for ONUs. For example, an operator of the PON may choose to connect the ONUs of PON C with the splitter of PON A via a splitter to ONU connection 170. Another example is PON E, wherein the splitter of PON E is connected with the ONUs of PON A via a splitter to ONU connection 170. Further, the splitter of PON B has a splitter to splitter connection with PON A, and the splitter of PON B will broadcast data traffic from any ONU in PON A to any connected ONU in the neighbouring PON F via a splitter to ONU connection 170. Another example to connect neighbouring PONs is PONA and PON G. The splitter of PON D has a splitter to splitter connection 180 with PON A, and the splitter of PON D will broadcast data traffic from any ONU in PON A to any connected ONU in the neighbouring PON G via a splitter to ONU connection 170. Further, a splitter to ONU connection 170 is provided between PON B and PON I. If an ONU in either PON B or PON I is sending on a uplink or upstream channel λu, said data of the channel λu will be broadcasted to other ONUs in said PON B and PON I and some other neighbouring PONs.

Besides the advantages described in the described PON and PONs structure of FIG. 6, the PON and PONs structure of FIG. 7 offers further advantages, e.g. high flexibility for backhaul connectivity between cells, fully extendable inter-RBS connectivity, dynamic clustering of eNBs in LTE advance, and improved user experience, and having same quality of signal all over the area.

Figure 8:
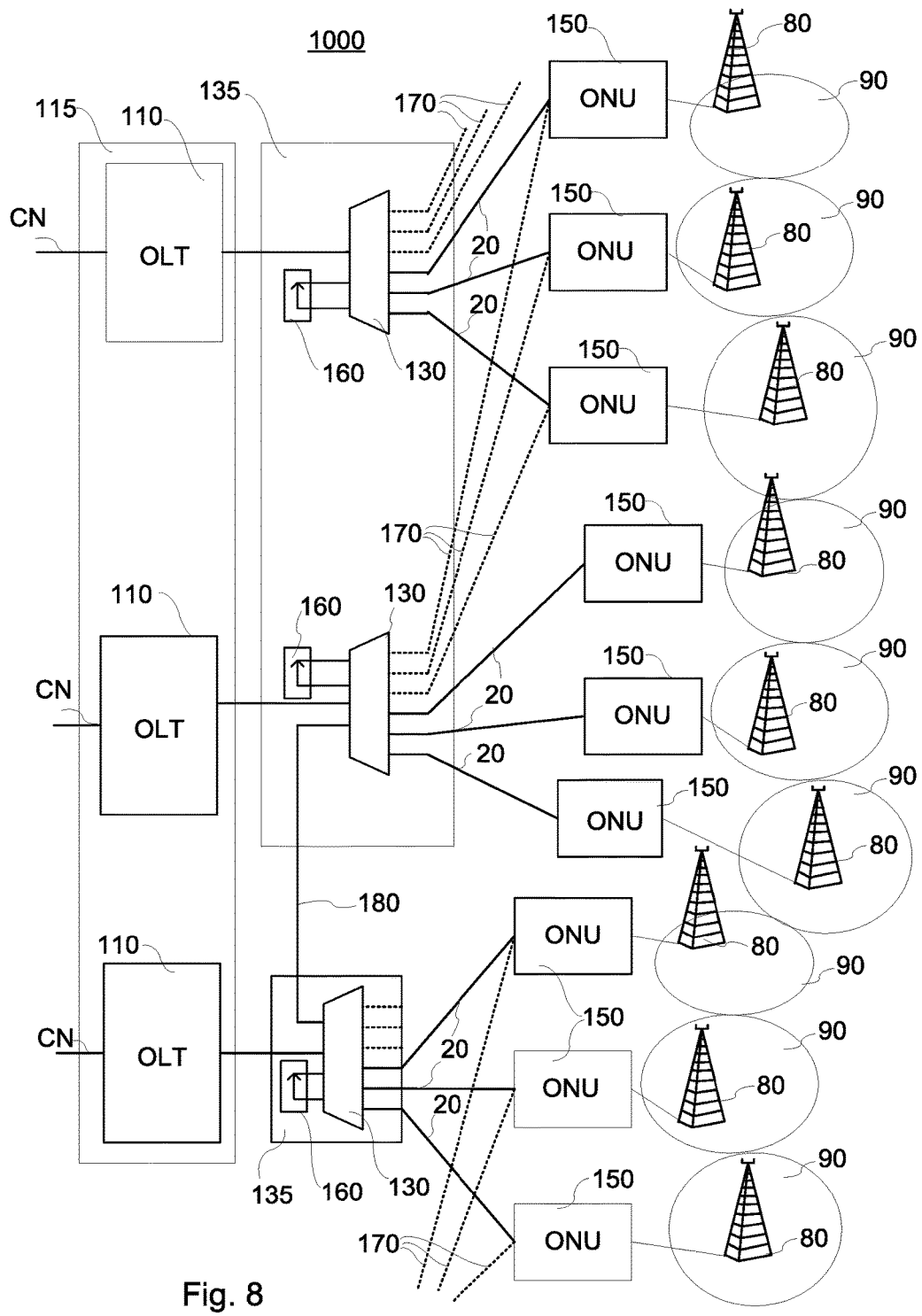
FIG. 8 is a block diagram illustrating a PONs structure applied in a backhaul network.

FIG. 8 is illustrating a PONs structure applied to a backhaul network of a RAN.

In the PONs structure 1000 in FIG. 8 is three of several PONs illustrated. Each PON has an OLT 110 in a central office 115. Two remote nodes 135 are located between the central office with the OLTs 110 and the ONUs 150. Each remote node 135 comprises one or more splitters 130 each connected to one OLT. Each ONU 150 is connected to a radio base station, RBS, 80. Each RBS is serving user equipments (not shown) within the RBS coverage area, i.e. cell. The RBSs 80 constitute a Radio Access Network, RAN.

Thus, a Passive Optical Networks, PONs, structure 1000 constituting at least a part of a backhaul network for supporting a RAN, in which a number of radio base stations, RBSs, 80 are connected to optical networks units, ONUs, 150 of said PONs structure. The ONUs 150 of said PONs structure 1000 are grouped between separate PONs of said PONs structure. The ONUs of a separate PON are interconnected passively through a power splitter 130 of the PON in order to separate inter base station traffic of X2 interfaces from uplink and downlink data traffic of S1 interface heading from/to a core network CN via an OLT. The remote node 135 comprises a power splitter 130 for enabling interconnection between ONUs of different PONs of said PONs structure.

Figure 9:
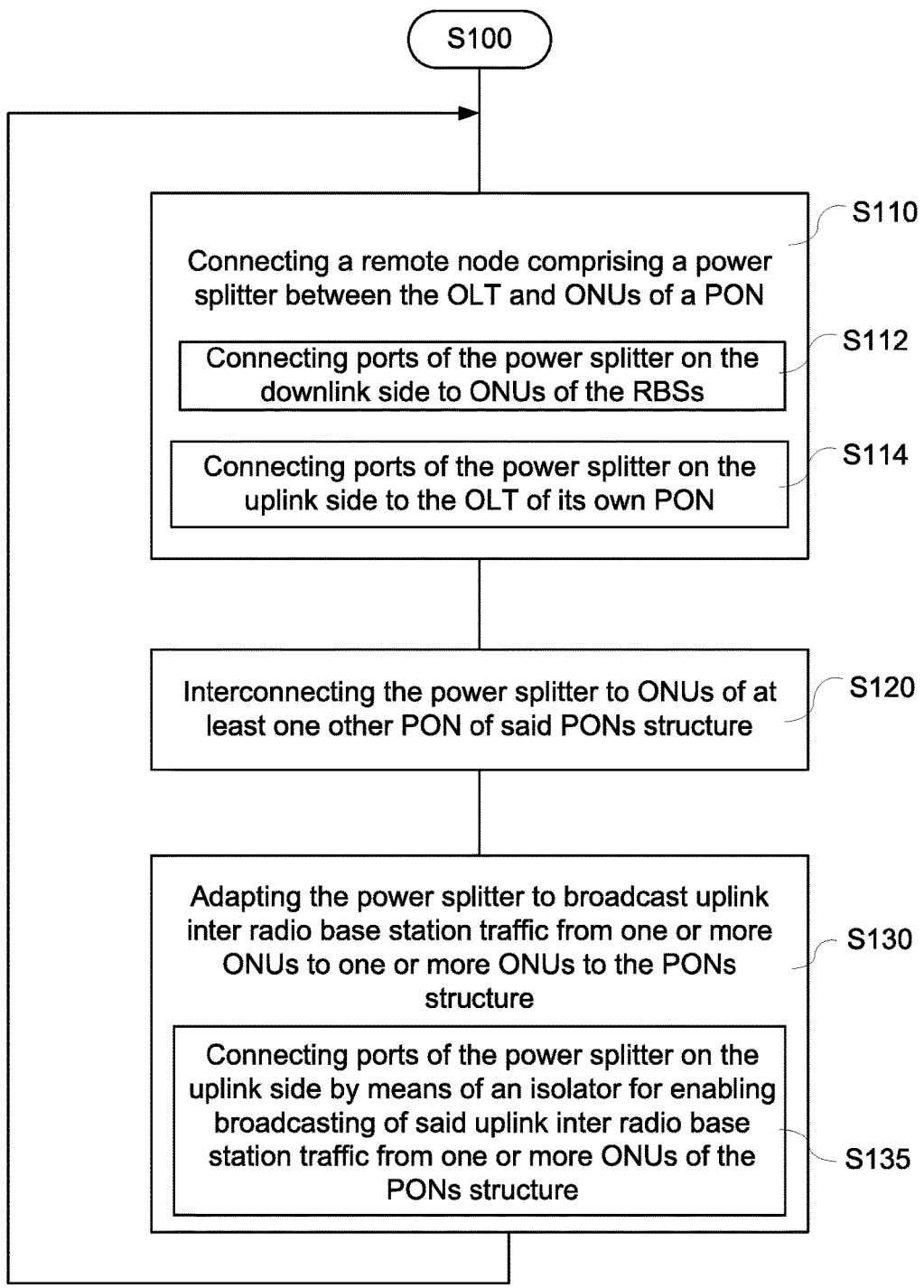
FIG. 9 is a flowchart illustrating a method for providing a PONs structure applied in a backhaul network.

The object to provide a network structure that offers more flexibility regarding scalability and cell clustering with minimizing the latency and cost may be achieved by a method S100A, which is illustrated in a flowchart of FIG. 9. The method S100A comprises the steps of:

S110:—Connecting a remote node comprising a power splitter between the OLT and ONUs of a PON;

S120: Interconnecting the power splitter to ONUs of at least one other PON of said PONs structure.

The method further comprises:

S130:—Adapting the power splitter to broadcast uplink inter radio base station traffic from one or more ONUs to one or more ONUs to the PONs structure.

The step S110 may involve the following sub-steps:

S112:—Connecting ports of the power splitter on the downlink side to ONUs of the RBSs; and S114:—Connecting ports of the power splitter on the uplink side to the OLT of its own PON.

The step S130 may involve the following sub-steps:

S135:—Connecting ports of the power splitter on the uplink side by means of an isolator for enabling broadcasting of said uplink inter radio base station traffic from one or more ONUs of the PONs structure.

Thus, the above described method S100 provides a PONs structure applied in a backhaul network, wherein broadcasting of said uplink inter radio base station traffic from one or more ONUs of the PONs structure to one or more ONUs of the PONs structure. The interconnection is achieved by a splitter to ONU connections.

Figure 10:
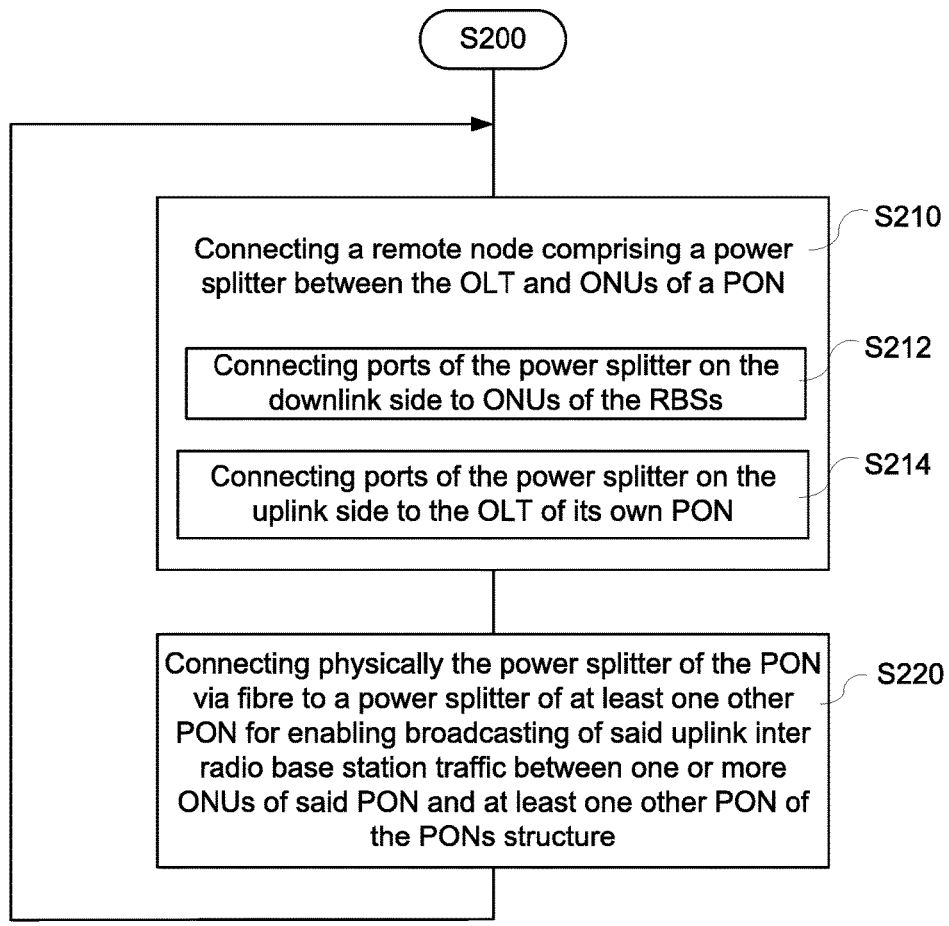
FIG. 10 is a flowchart illustrating an alternative method for providing a PONs structure applied in a backhaul network.

An alternative method for providing a network structure that offers uplink inter radio base station traffic from one or more ONUs of the PONs structure to one or more ONUs of the PONs structure is the method S200, which is illustrated in a flowchart of FIG. 10. The method S200 comprises the steps of:

S210:—Connecting a remote node comprising a power splitter between the OLT and ONUs of a PON;

The step S210 may involve the following sub-steps:

S212:—Connecting ports of the power splitter on the downlink side to ONUs of the RBSs; and S214:—Connecting ports of the power splitter on the uplink side to the OLT of its own PON.

The method S200 further comprises the step of:

S220:—connecting physically the power splitter of the PON via fibre to a power splitter of at least one other PON for enabling broadcasting of said uplink inter base station traffic between one or more ONUs of said PON and at least one other PON of the PON structure. The interconnection is achieved by a splitter to splitter connection.

As illustrated in FIG. 8, the power splitter 130 of the PON 100 may belong to a splitter arrangement 133 in a remote node 135 of the PONs structure 1000.

The ONUs of a separate PON are interconnected passively through the remote node of the PON in order to separate inter radio base station traffic of X2 interfaces from uplink and downlink data traffic of S1 interface heading from/to a core network via an OLT. The remote node comprises one or more power splitters for enabling interconnection of the remote node to ONUs of at least one other PON of said PONs structure.

The remote node is adapted to broadcast uplink inter radio base station traffic from one or more ONUs to one or more ONUs of the PONs structure 1000.

According to one embodiment of the remote node, of which the power splitter has one uplink side and one downlink side, wherein ports of the downlink side is connected to ONUs of the RBSs and ports of the uplink side are at least connected to the OLT of its own PON and an isolator for enabling broadcasting of said uplink inter base station traffic from one or more ONUs of the PONs structure.

According to another embodiment of the remote node, of which the power splitter has one uplink side and one downlink side, wherein ports of the downlink side is connected to ONUs of its own PON and ports of the uplink side are at least connected to the OLT of its own PON the power splitter of the PON is physically connected via fibre to an power splitter of at least one other PON for enabling broadcasting of said uplink inter base station traffic between one or more ONUs of said PON and at least one other PON of the PON structure.

The power splitter may belong to a splitter arrangement of the PONs structure.

The above described PONs structure and remote node comprising a power splitter offers a number of advantages over prior art. One such advantage is high flexibility for backhaul connectivity between cells. Further advantages that are provided with the herein described technology, e.g. dynamic clustering of eNBs in LTE Fully extendable inter-RBS connectivity, advance, low cost, Fixed and mobile backhaul coexistence, and capacity saving in the feeder fibre, OLT and aggregation networks.

It is understood that the above PONs and PONs structures are advantageous for coordinated multipoint, CoMP, backhauling solutions as said PONs and structures are designed for supporting, CoMP, transmission and reception in the long term evolution (LTE)-Advanced framework.

The ONUs of a separate PON are interconnected passively through a remote node of the PON in order to separate inter base station traffic of X2 interfaces from uplink and downlink data traffic of S1 interface heading from/to a core network CN via an OLT.

This is described in more detail with reference to FIGS. 11. 12, 13 and 14.

Any data sent by each ONU may not only goes to the OLT but also is broadcasted to all the ONUs connected to the same splitter. Therefore, λu which is wavelength for upstream, can also be used for the interconnection among the eNBs, as well as sending data from ONU to the mobile core centre. As the ONU needs to simultaneously receive the wavelength coming from the OLT (λd) (broadcasted to all ONUs), along with λu used for the CoMP signalling and data traffic among adjacent cells, two independent receivers are required at the ONU.

The different ONUs of said drawings are only very schematically illustrated to avoid any confusing detail or component being of little or no interest for the understanding of the concept.

Figure 11:
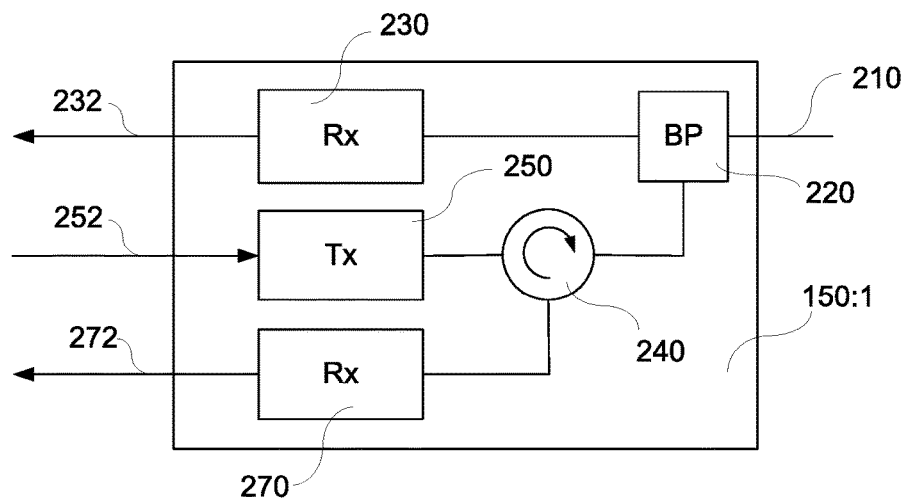
FIG. 11 is a block diagram illustrating an embodiment of an ONU adapted to operate in a PONs structure according a first scheme.

FIG. 11 is a block diagram illustrating an embodiment of an ONU adapted to operate in a PONs structure according a first scheme.

The first scheme is adapted to a PON as illustrated in FIG. 3. The ONU is provided with an interface which is connected to a bandpass, BP, filter unit 220. The BP of the ONU is connected to a first receiver, Rx, 230 having an interface 232. The BP 220 is also connected to a circulator 240. The circulator is connected to a second receiver, Rx, 270 having an interface 272. The circulator 240 is also connected to a transmitter, Tx, 250 having an interface 252.

As the ONU needs to simultaneously receive the wavelength coming from the OLT (λd) (broadcasted to all ONUs), along with λu used for the CoMP signalling and data traffic among adjacent cells, two independent receivers, Rx-230 and 270, are required.

Receiver Rx 230 will receive information on channel λd which comes from OLT. The information is forwarded to the S1 interfaces of RBSs via output 232. Rx 270 receives λu coming from neighbouring ONUs that carry inter cell information and these data will be forwarded to X2 interface via interface 272. The interfaces 232, 252 and 272 can be logical or physical interfaces. As λd and λu are sent via same fibre (210) coming in to the ONU, band filter 220 will separate two wavebands related to upstream and downstream channels and send each to a separate output of BP. Transmitter 250 is responsible to send the information coming from the RBS from 252 (both data to OLT and other ONUs) towards backhaul network. An optical circulator is a special fibre-optic component that can be used to separate optical signals that travel in opposite directions in an optical fibre (such as λu in this case). An optical circulator is a three-port device designed such that light entering any port exits from the next. This means that λu coming from Tx will be sent to BP 220, and λu coming from BP will be sent to Rx 270. Circulators can be used to achieve bi-directional transmission over a single fibre and that is why we used it here to be able to send and receive λu in the same fibre.

Figure 12:
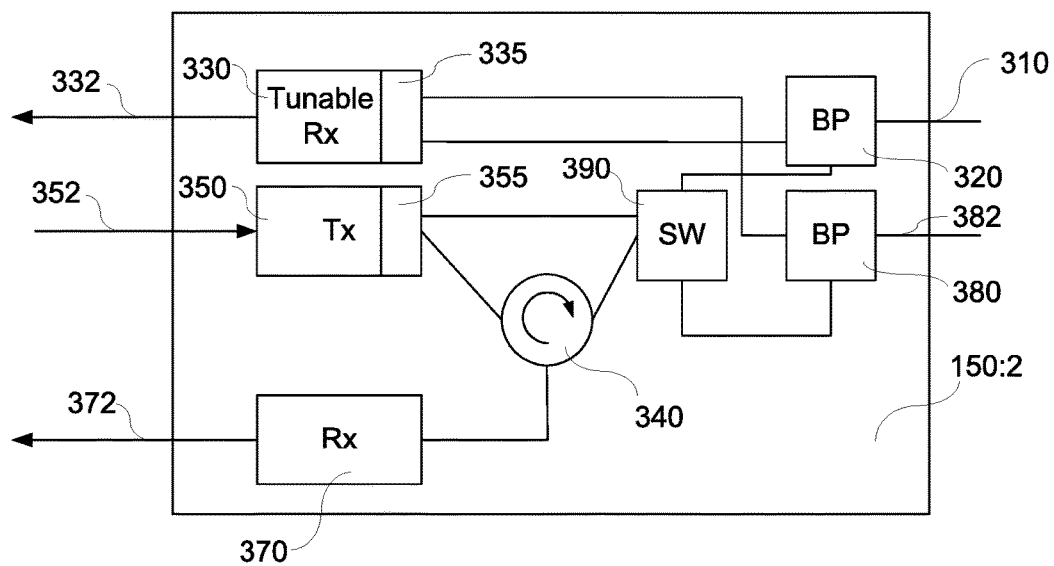
FIG. 12 is a block diagram illustrating an embodiment of an ONU adapted to operate in a PONs structure according a second scheme.

FIG. 12 is a block diagram illustrating an embodiment of an ONU adapted to operate in a PONs structure according a second scheme.

The second scheme is adapted to a PON as illustrated in FIG. 4. In this scheme, the ONU is connected to two fibres and has two interfaces 310, 382 on the OLT side. Two fibre connections act both as the connection for having backhaul connectivity between neighbouring RBSs as well as adding end to end protection. In the normal situation, λd1 sent from working OLT through fibre 310, will be received by BP 320.

BP will separate the waveband of this channel and send it to the tuneable receiver Rx 330, and this information will be further forwarded towards S1 interface of RBS through interface 332. If a failure occurs in the network related to this ONU or the working OLT, then backup OLT will send the downstream information through the neighbouring PON on a different downstream wavelength λd2 which will be received via fibre link 382 and same as before will be sent to Rx 330. In such cases, Rx will be tuned to receive λd2 instead of λd1. Optical switch 335 is responsible to connect two input ports from BP 320 and BP 380 to the only interface of Rx 330. Optical switch (SW) 390 is responsible for connecting BP 320 and BP 380 to the Tx 350 and Rx 370 via circulator 340. The information coming from RBS via interface 352 and will be further sent towards optical network via Tx 350. Coupler 355 is responsible to connect Tx to the both interfaces towards SW 390 and circulator 340. Everything coming from Tx 350 will be sent to the SW 390 both via direct connection and via circulator, and hence will be sent to both BP 320 and BP 380 to be further sent out to both fibres 310 and 382 in order to reach two splitters connected to this ONU. Rx 370 will receive any information coming on λu channel, which might come either from fibres 310 or 382 and will be sent to SW 390 from one of the BPs which receives it. The SW 390 sends this information to the circulator which further will be sent to Rx 370 and further toward X2 interface of RBS via 372. As mentioned before, interfaces 332, 352 and 372 might be physical or logical.

Figure 13:
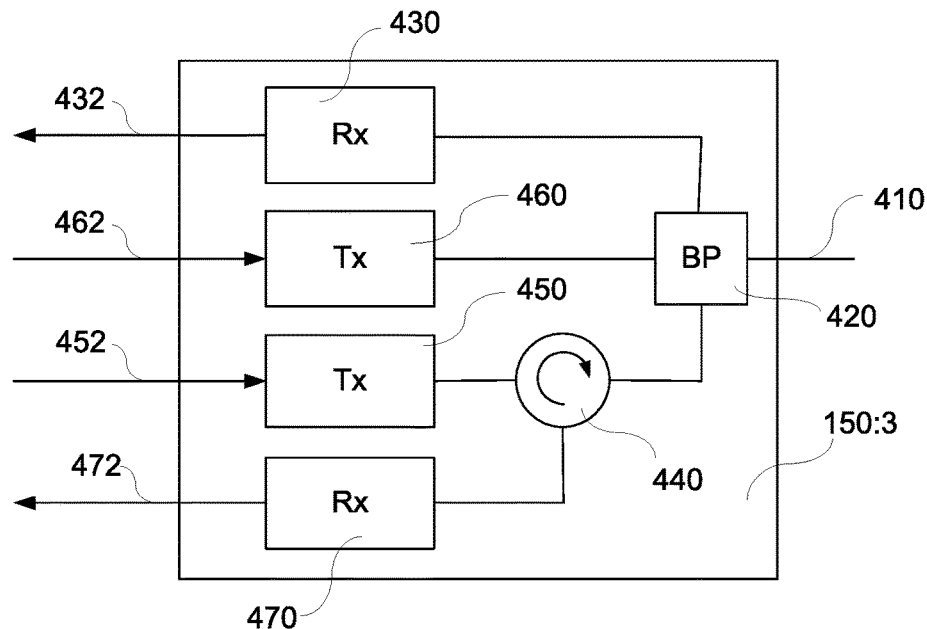
FIG. 13 is a block diagram illustrating an embodiment of an ONU adapted to operate in a PONs structure according a third scheme.

FIG. 13 is a block diagram illustrating an embodiment of an ONU adapted to operate in a PONs structure according to a third scheme.

The third scheme is adapted to a PON as illustrated in FIGS. 5 and 6. In this architecture a separate wavelength channel λi is used for the inter RBS communication in both upstream and downstream directions in order to have enough capacity for the inter RBS connections. The data send from OLT to the ONU through fibre 410 on λd will be received by BP 420 and will be filtered to be sent to the receiver Rx 430, and further towards S1 interface of RBS through 432. The data from S1 interface towards core network or OLT comes from interface 462 to the Transmitter Tx 460. This information will go to BP 420 and further to be combined with other channels and sent to the OLT via fibre 410. Inter RBS data coming in to the ONU via fibre 410 will be filtered by BP 420 and will be sent to circulator 440. Circulator sends incoming traffic to the Rx 470 which is connected to X2 interface of RBS via 472. The inter RBS traffic coming from X2 interface via 452 will be send to circulator via Tx 450. Then circulator sends this data to BP which will be combined with traffic from S1 interface and then to the optical network via fibre 410.

Figure 14:
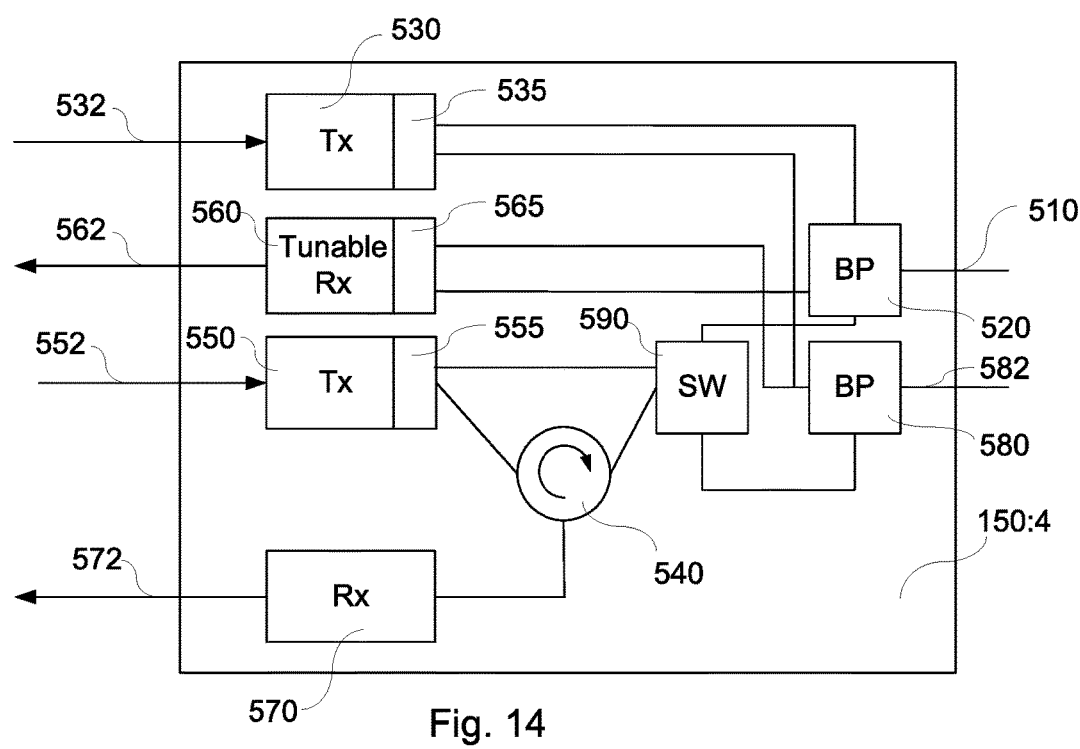
FIG. 14 is a block diagram illustrating an embodiment of an ONU adapted to operate in a PONs structure according a forth scheme.

FIG. 14 is a block diagram illustrating an embodiment of an ONU adapted to operate in a PONs structure according a fourth scheme.

The fourth scheme is adapted to a PON as illustrated in FIG. 7.

Transmitters and receivers act equivalently as in the ONU in the previous figure and circulator 540 and optical switch 590 are the same as in the ONU in FIG. 10. Two fibres 510 and 582 are for both protection and inter PON connection. BP 520 and 580 separate or combine the incoming and outgoing channels to the relevant interfaces. Separate wavelength λi is used for inter RBS connection. Therefor two receivers Rx 560 and Rx 570 will receive λd from OLT and λi from neighbouring ONUs, while two transmitters Tx 530 and Txi 550 send information from S1 and X2.

Optical switches 565 and tuneable receiver Rx 560 for downstream wavelength are to provide the resilience in case of failure. If a failure occurs, the backup OLT will communicate to the ONUs using different wavelength for downstream and hence ONUs needs to retune to this new wavelength. Band filters are responsible for separating the downstream and upstream wavebands.

A number of embodiments of the present technique have been described. It will be understood that various modifications may be made without departing from the proposed solution. Therefore, other implementations are within the scope of the following claims.

| Abbreviation | Explanation |
| --- | --- |
| CoMP | Coordinated Multipoint |
| LTE | Long Term Evolution |
| PON | Passive Optical Network |
| WDM | Wavelength Division Multiplexing |
| TDM | Time Division Multiplexing |
| OLT | Optical Line Terminal |
| ONU | Optical Network Unit |
| RN | Remote Node |
| RBS | Radio Base Station |
| eNB | Evolved Node B |
| TWDM | Time/Wavelength Division Multiplexing |
| NGPON | Next Generation Passive Optical Network |
| TDMA | Time Division Multiple Access |
| AWG | Array Waveguide Grating |
| CPRI | Common Public Radio Interface |
| 3GPP | $3^{rd}$ Generation Partnership Project |
| PtP | Point to Point |

The invention claimed is:

1. A Passive Optical Networks (PONs) structure having a plurality of PONs and constituting at least a part of a backhaul network for supporting a Radio Access Network, in which a number of radio base stations (RBSs) are connected to optical networks units (ONUs), wherein the ONUs are grouped between separate PONs of said PONs structure, wherein ONUs of a respective separate PON of the plurality of PONs are interconnected passively through a remote node to an optical line terminal (OLT) of the respective separate PON, and wherein the remote node comprising:
a power splitter having a first set of ports on an uplink side and a second set of ports on a downlink side, wherein the second set of ports are connected to ONUs and at least one port of the first set of ports is connected to the OLT of the respective separate PON; and
an isolator connected to at least two ports of the first set of ports to redirect uplink data traffic from one of the ONUs for output onto one or more ports of the second set of ports to other ONUs connected to the second set of ports,
wherein the power splitter provides switching to implement the S1 interface between the OLT and ONUs of the respective separate PON and X2 interface for inter base station traffic between the ONUs.

2. The PONs structure according to claim 1, wherein the power splitter is configured to broadcast the inter base station traffic from one or more ONUs connected to the second set of ports to one or more other ONUs of another PON of the PONs structure.

3. The PONs structure according to claim 2, wherein at least one ONU of another PON is connected to the second set of ports.

4. The PONs structure according to claim 2, wherein a port of the first set of ports of the power splitter is physically connected to a power splitter of at least one other PON via fibre for enabling to broadcast the inter base station traffic between ONUs of different PONs of the PONs structure.

5. A remote node of a Passive Optical Networks (PONs) structure having a plurality of PONs and constituting at least a part of a backhaul network for supporting a Radio Access Network, in which a number of radio base stations (RBSs) are connected to optical networks units (ONUs), wherein the ONUs are grouped between separate PONs of said PONs structure, wherein ONUs of a respective separate PON of the plurality of PONs are interconnected passively through the remote node to an optical line terminal (OLT) of the respective separate PON, and wherein the remote node comprising:
a power splitter having a first set of ports on an uplink side and a second set of ports on a downlink side, wherein the second set of ports are connected to ONUs and at least one port of the first set of ports is connected to the OLT of the respective separate PON; and
an isolator connected to at least two ports of the first set of ports to redirect uplink data traffic from one of the ONUs for output onto one or more ports of the second set of ports to other ONUs connected to the second set of ports,
wherein the power splitter provides switching to implement a S1 interface between the OLT and ONUs of the respective separate PON and a X2 interface for inter base station traffic between the ONUs.

6. The remote node according to claim 5, wherein the power splitter is configured to broadcast the inter base station traffic from one or more ONUs connected to the second set of ports to one or more other ONUs of another PON of the PONs structure.

7. The remote node according to claim 6, wherein at least one ONU of another PON is connected to the second set of ports.

8. The remote node according to claim 6, wherein a port of the first set of ports of the power splitter is physically connected via fibre to an power splitter of at least one other PON for enabling to broadcast the inter base station traffic between ONUs of different PONs of the PONs structure.

* * * * *